United States Patent [19]
Sansone et al.

[11] Patent Number: 4,853,865
[45] Date of Patent: Aug. 1, 1989

[54] MAILING SYSTEM WITH POSTAGE VALUE PRINTING CAPABILITY

[75] Inventors: Ronald P. Sansone, Weston; Guy L. Fougere, Easton, both of Conn.

[73] Assignee: Pitney Bowes Inc., Stamford, Conn.

[21] Appl. No.: 182,270

[22] Filed: Apr. 15, 1988

Related U.S. Application Data

[62] Division of Ser. No. 813,459, Dec. 26, 1985, Pat. No. 4,760,532.

[51] Int. Cl.⁴ .................. G06F 15/20; G06G 7/48; G06K 19/06
[52] U.S. Cl. .................. 364/464.02; 364/519; 235/375
[58] Field of Search ......... 364/464.02, 464.03, 364/466, 519; 380/25; 235/375, 380, 495

[56] References Cited

U.S. PATENT DOCUMENTS

| 4,511,793 | 4/1985 | Racanelli | 364/464.03 |
| 4,712,929 | 12/1987 | Kitaoka | 364/464 X |
| 4,725,718 | 2/1988 | Sansone et al. | 235/375 X |
| 4,743,747 | 5/1988 | Fougere et al. | 235/375 X |
| 4,760,532 | 7/1988 | Sansone et al. | 364/464.03 |
| 4,760,534 | 7/1988 | Fougere et al. | 364/464.03 |

FOREIGN PATENT DOCUMENTS 2193157 3/1988 United Kingdom ......... 364/464.02

Primary Examiner—Parshotam S. Lall
Assistant Examiner—Joseph L. Dixon
Attorney, Agent, or Firm—Peter Vrahotes; Melvin J. Scolnick; David E. Pitchenik

[57] ABSTRACT

A system for processing batch mail in which a mail sender processes batches of mail each of which includes a statement containing data that allows mail payment verification. Included in this data is the balance of postage value after processing the mail.

14 Claims, 5 Drawing Sheets

```
┌─────────────────────────────────────────────────┐
│ ┌┤│┠                                            │
│ ┝━┿┥ PB  SERVER  NO.7124   CUSTOMER  NAME       │
│ ┥│┝┨                                            │
│                                                 │
│   T.A. NO.      PIECE COUNT       REG. AM.      │
│   DATE          TIME              CLASS         │
│   BATCH NO.     RUN NO.           POST. TOTAL   │
└─────────────────────────────────────────────────┘
```
                          46 ↗

FIG. 2

```
┌──────────────────────────────────────────────────┐
│                                    ┌───────────┐ │
│ ADDRESSOR                          │US POSTAGE │ │
│                                    │FIRST CLASS│ │
│                              43 ↙  │  - PAID - │ │
│                                    │PB SERVER#7124│
│                                    └───────────┘ │
│                                                  │
│     22¢101885*C2J2743T56                         │
│     JOHN J. DOE                                  │
│     TAIL SPIN ROAD                               │
│     WAXTON CT. 06999-1243                        │
│                                                  │
└──────────────────────────────────────────────────┘
```
                                    42 ↗

FIG. 3

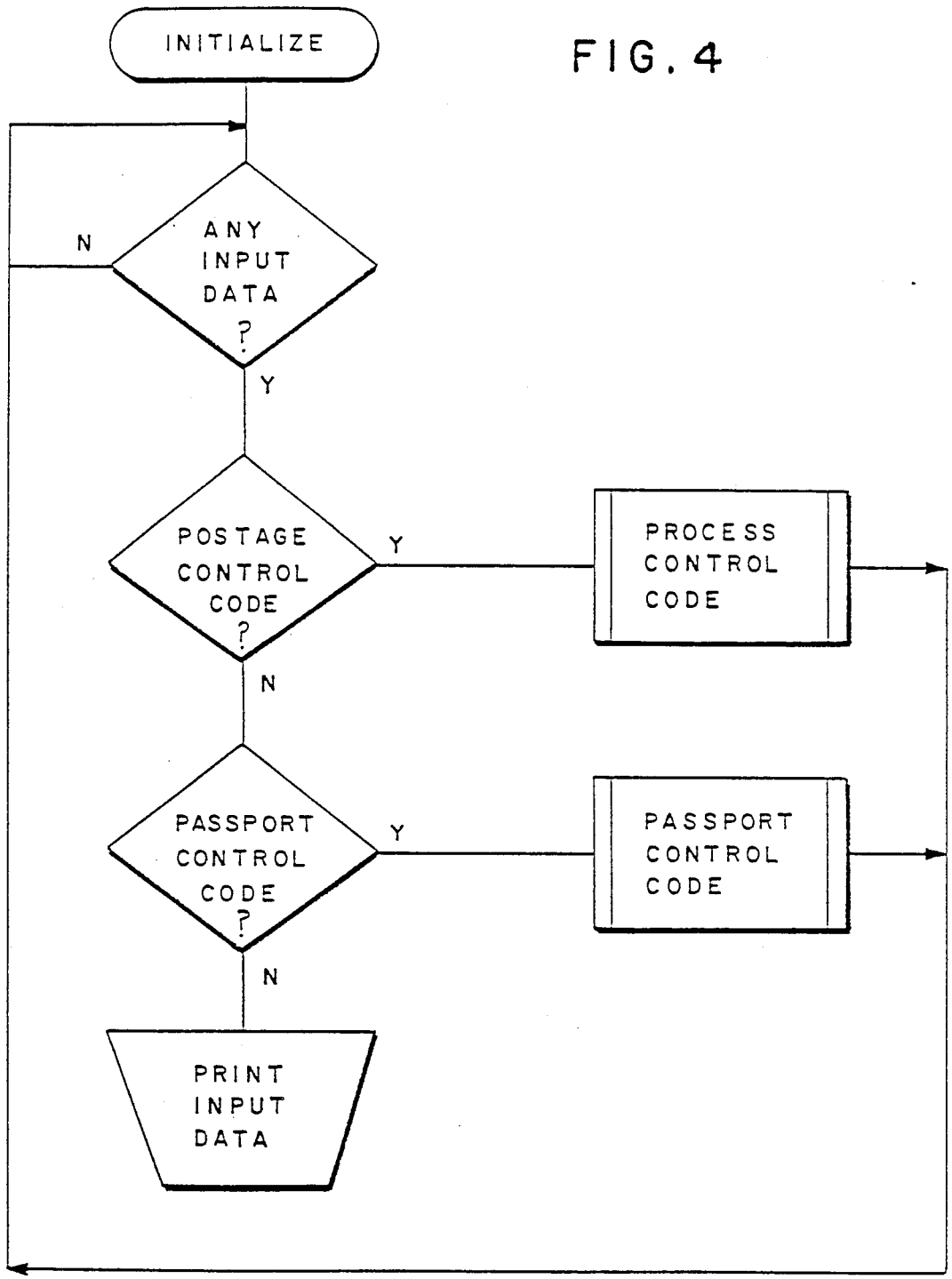

MAILING SYSTEM WITH POSTAGE VALUE PRINTING CAPABILITY

This patent application is a divisional application under 37 CFR 1.60 of pending prior application having Ser. No. 813,459, filed Dec. 26, 1985 and issued as U.S. Pat. No. 4,760,532.

RELATED CASES

Subject matter similar to the subject matter contained in the instant application maybe found in U.S. patent application entitled "POSTAGE AND MAILING INFORMATION APPLYING SYSTEM" by Ronald Sansone and et filed Aug. 6, 1985, having serial number 762,994 now U.S. Pat. No. 4,725,718 and assigned to the assignee of the instant application.

Background of the Invention

Certain organizations dispatch large amounts of mail periodically. Examples of such organizations are: banking institutions, utility companies, insurance companies, credit companies, and the like. With such large quantities, these mailers normally pre-package and pre-sort their mail and are given a lower postage rate by the postal service because of the time saved by the postal service. There are generally two ways in which such mail senders apply postage to their mail. The most common way is by use of a postage meter which is leased by the mailer from a postage meter manufacturer with which the amount of postage required is applied to each mail piece. Inserter systems have been developed whereby inserts may be placed into an envelope, the envelope may be sealed, addressed and have a postage indicia applied thereto. The mail pieces may be weighed on the fl or individual weighing may not be required if all the mail pieces are of like kind, i.e., only a sample mail piece need be weighed. These acts of processing mail may be performed at a relatively high rate of speed.

A second method of mailing large quantities of mail pieces is the permit mail system. In such a system, the mailer places a permit number on the mail pieces and prepares a manifest listing that shows the type and number of mail pieces being mailed on each occasion and the postage required.

With both such systems, inspection at the site of the mail sender is required. In the case of the postage meter, the lessor of the postage meter, i.e., the postage meter manufacturer, is required by law to inspect the postage meter at least twice a year to assure that there is no evidence of tampering with the postage meter that will indicate an attempt to obtain unauthorized postage. In the case of permit mail, large quantities of the same type of mail will be mailed at one time and the postal service will conduct an inspection to verify that the manifest listing accompanying the permit mail accurately accounts for the amount of postage due for the mail that has been processed by the postal service. This is accomplished through an inspection on the part the postal service by examining the records of the mail user on every occasion.

Obviously, each of these two systems has certain drawbacks. In the case of on-site inspection of postage meters, with the large number of postage meters in use by large mail senders it is an expensive matter for the inspection thereof. Furthermore, postage meters that process large quantities of mail must be replaced frequently because of wear. With regard to the permit mail system, the shortcoming lies in the need of the postal service to send a representative frequently to the various mailer locations to assure that the sender is accurately accounting for the quantity of mail being sent. Such a scheme is not totally reliable as it relies upon on-site verification using the mailers records which are not secure.

Systems have been developed and are presently in commercial use for the transfer of funds from one meter being taken out of service to another meter being placed in service. This may occur when one meter is being removed from service and another meter is being installed in its place. For example, as described in U. S. Patent No. 3,884,745, the replacement may be to accommodate a change in models or replacement of an inoperative meter. Under existing commercial practice both meters are concurrently taken to the Post Office to effect: removal of one meter from service, installation of the new meter into service, and transfer of unused postage to the new meter.

The exchange of funds is currently accomplished as follows: A postal worker phones a data center, such as the Pitney Bowes Meter Resetting Data Center and (a) requests the meter replacement function, (b) provides the customer account number, (c) provides the serial number of the meter being removed and (d) provides the serial number of the meter being installed.

For the meter being removed under the current practice, the postal worker also provides to the data center (a) an access code generated by the meter, (b) the meter ascending register value (as displayed on the meter display) and (c) the meter descending register value (as displayed by the meter). The worker receives from the data center and records a combination provided by the data center such as a four digit combination.

The postal worker, for the meter being installed, provides to the data center (a) an access code generated by the meter to be installed such as is disclosed in U.S. Pat. No. 4,442,501 (b) the ascending register value (as displayed by the meter display) and (c) the descending register value (as displayed by the meter). The worker then receives from the data center and records a reset combination such as a digit reset combination to recharge the meter.

The postal worker clears the descending register of the meter being removed from service by entering the received and recorded reset combination from the data center. The postal worker then resets the replacement meter by entering the amount of reset as issued by the data center including both the amount of the reset and the reset combination.

It should be noted that one meter suitable for being reset in accordance with the above procedure is shown and described in U.S. Pat. No. 4,301,507 which is suitable for use in a variable amount recharging system such as shown in U.S. Pat. No. 4,097,923.

SUMMARY AND OBJECTS OF THE INVENTION

A system has been conceived whereby a mailer will be able to send large quantities or batches of mail without the need of on-site inspections. This is accomplished by the mailer having a secure accounting unit similar to a postage meter in which postage value is placed by a dispensing or central station. A statement accompanies each batch of mail which statement may include information relative to the mail and the amount of postage required to send the mail and the amount of postage value remaining with the mail sender. Communication between the central station and the mail sender allows postage value to be transferred to and from the user by the central station and mailing and verification data to be sent to the central station from the mailer. The mailing and verification data will be the same as that contained on the mailing statements that accompany the batches of mail. This system provides a central station for a large number of mail senders whereby the postal service is relieved of its obligation of having on-site inspections and the central station acts as a clearing house for the postal service through whom verification of postage can be conveniently and inexpensively achieved.

A feature of the instant invention is that the amount of postage value remaining in the account of the mailer is printed upon each statement accompanying mail batches. This provides a permanent record of the postage value held by the mailer.

BRIEF DESCRIPTION OF THE DRAWING

FIG. 2 is a plan view of an accounting statement that would accompany batch mail sent by the system of FIG. 1.; and FIG. 3 is a plan view of an envelope containing information that would be applied thereto by the system of FIG. 1.

FIGS. 4-6 contain flow diagrams that describe the functions of the system shown in FIG. 1.

DETAILED DESCRIPTION OF THE PREFERRED EMBODIMENT

Figure 1:
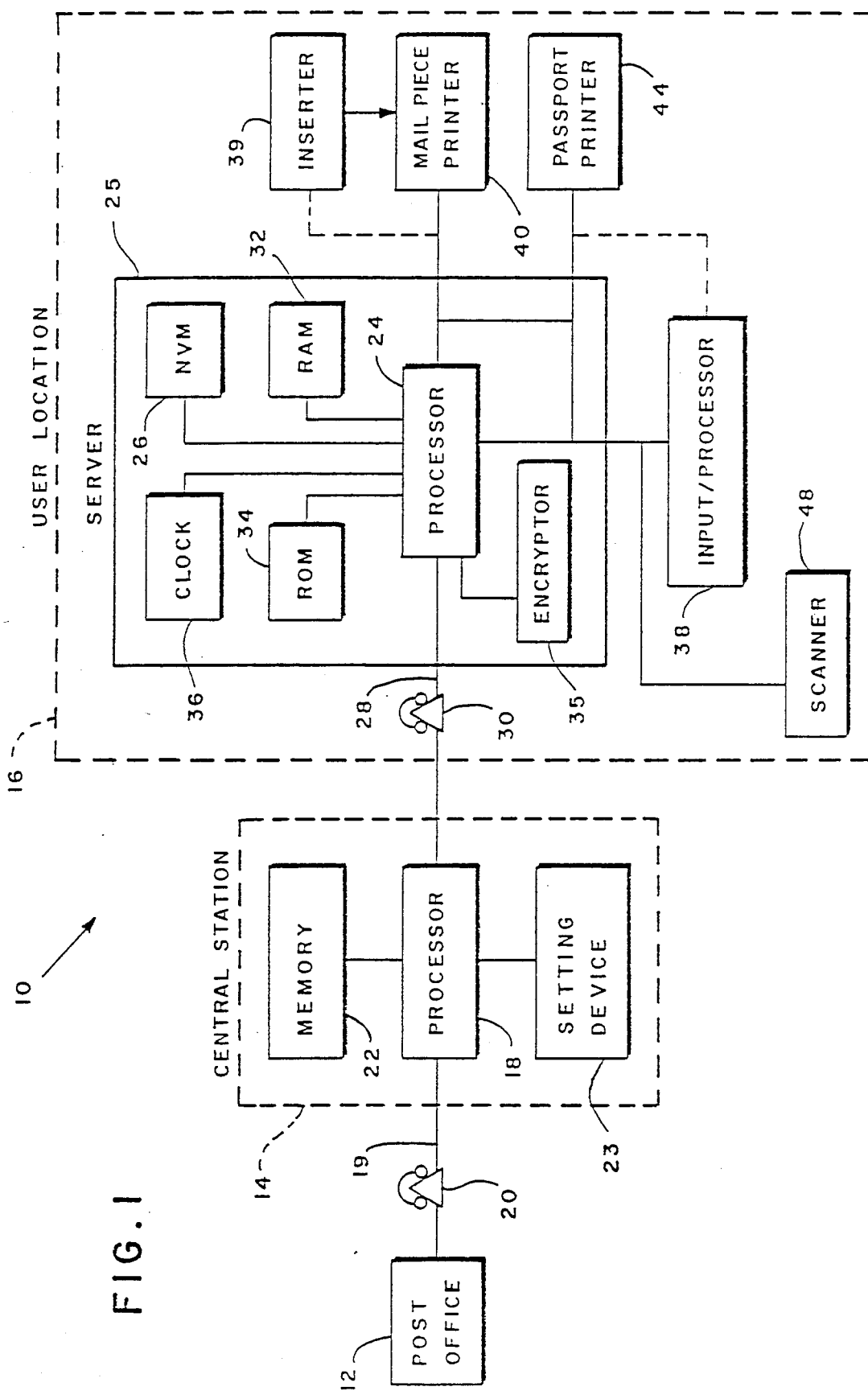
FIG. 1 is a block diagram of a batch mailing system.
Figure 5:
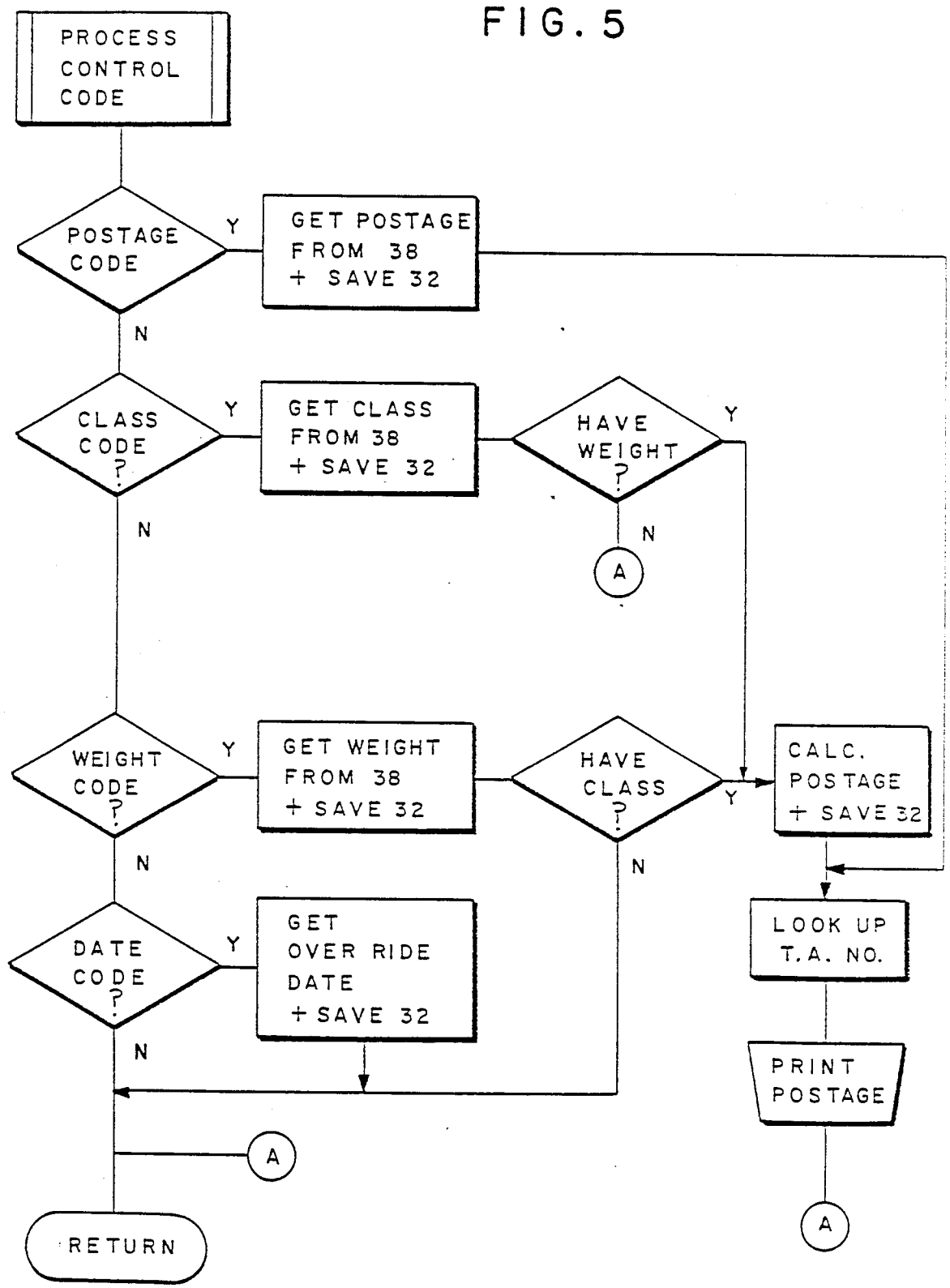
Figure 6:
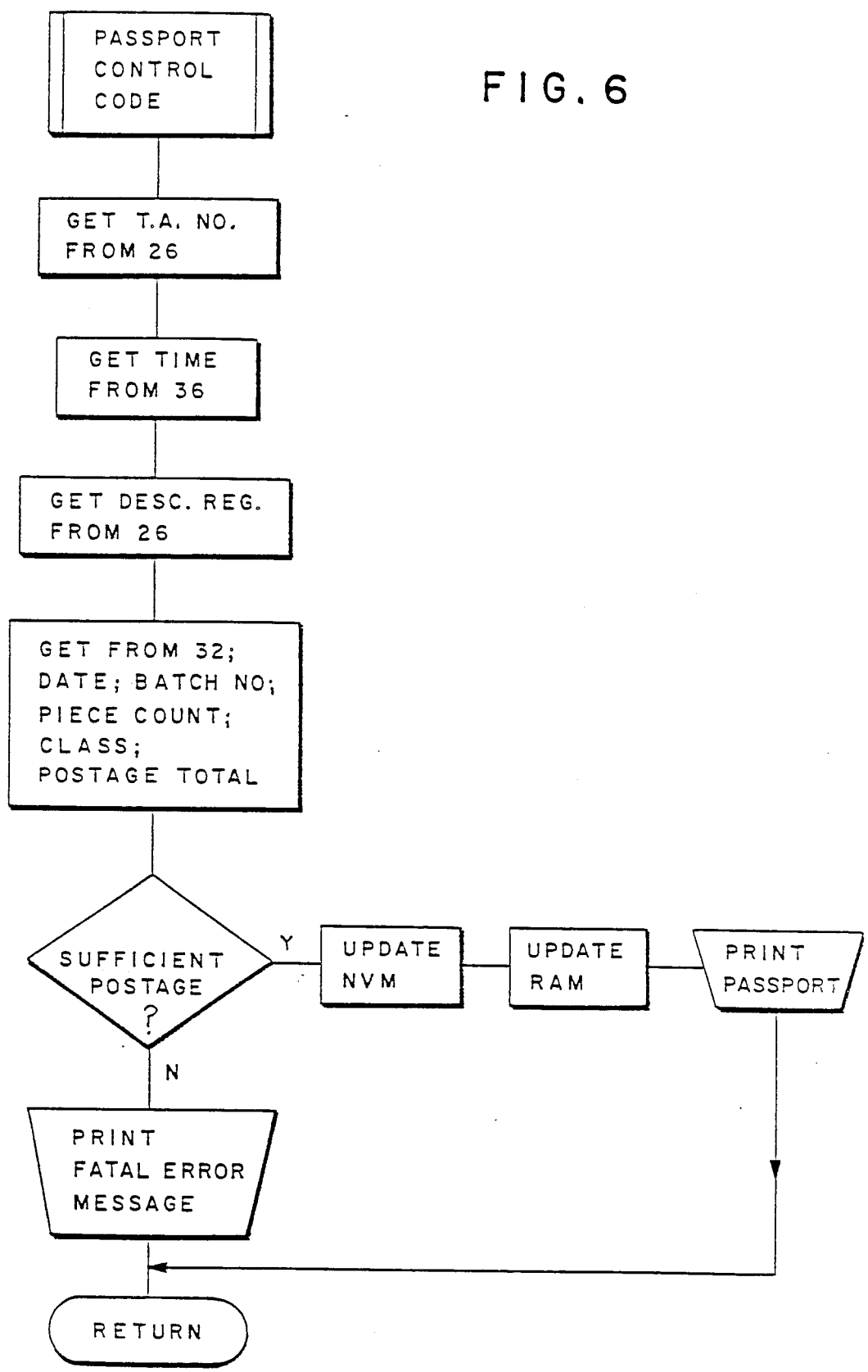

Referring now to FIG. 1, a batch mailing system is shown generally at 10 and includes a post office 12, a data center or central station 14 and a user location 16. The central station 14 has a processor 18. This processor 18 would be a main frame type of computer having substantial capacity. Communication is provided between the post office 12 and a plurality of central stations 14 (only one being shown) through a line or communication link 19 having a communication device such as a telephone 20 therein. Associated with the processor 18 and in connection therewith is a large storage memory unit 22 where large amounts of data can be stored and a register setting device 23 which includes encryption software of the type required in the resetting of postage meters remotely. Systems for the resetting of meters remotely are well known, see for example U.S. Pat. Nos. 3,792,446, 4,097,923 and 4,447,890.

A remote user station 16 has a secure unit 25 which will hereafter be referred to as a "server". The server 25 is supplied by the central station 14 to the user and includes a user processor 24 which may be a processor of much smaller capacity such as an Intel 8085 processor available from Intel Corporation, Santa Clara, Calif. Connected to the processor 24 is a memory 26. Preferably the memory 26 will be a non-volatile memory (NVM). The user processor 24 is connected to the central station processor 18 through a communication link or line 28. A telephone 30 or other communicating device may be disposed within the line 28 to thereby provide selective communication between the processors 18, 24. Also connected to the processor 24 are a RAM 32, a ROM 34, an encryptor 35 and a clock 36 whose respective functions will be described in detail hereinafter. An input/processor 38 is connected to the user processor 24 whereby data may be supplied, either manually or through a medium such as a disc or tape, to the user processor for the purpose of providing data required in the processing of mail pieces.

The server 25 has many characteristics of a postage meter as well as differences that will be discussed hereinafter. Postage meters are mass produced devices for printing a defined unit value for governmental or private carrier delivery of parcels and envelopes. The term postage meter also includes other like devices which provide unit value printing such as tax stamp meters. Postage meters include internal accounting devices which account for postage value representation which is stored within the meter. The accounting device accounts for both the recharging of the meter with additional postage value and the printing of postage by the meter printing mechanism. No external independent accounting system is available for accounting for the postage printed by the meter. Accordingly, postage meters must possess a high reliability to avoid the loss of user or governmental funds stored within the meter and dispensed by printing postage.

A high speed inserter 39 is in electrical communication with the server 25 and performs the physical acts involved in processing the mail such as the inserting of inserts into envelopes, sealing the envelope flaps, orienting the mail pieces and conveying the mail pieces to a postage meter. The term insert includes bills, advertising materials, notices, etc., which are of a size to be received within an envelope or the like. High speed inserters of this type are readily available commercially, as for example Inserter model No. 3100 series from Pitney Bowes Inc., Stamford, Ct.

A first printer 40 is in communication with the user processor 24 of the server 25 and with the input/processor 38 and is able to print upon mail pieces 42 such as envelopes containing inserts which it receives from the inserter 39. This printer 40 is one provided by the user and will be an unsecured, high speed printer which may be controlled either through the processor 24 or input/processor 38. A second printer 44 is provided to print upon a statement sheet 46 or other document. This second printer 44 is preferably a secure printer that is provided, by the central station 14. Obviously, the second printer 44 can be an unsecured printer but this occasions greater risk in terms of verifying payment of mail. Throughout the balance of the specification and claims this statement sheet 46 will be referred to as a "passport". Details of the passport 46 will be described hereinafter in conjunction with FIG. 2.

Although only one user location 16 is shown and described, it will be appreciated many user locations will be serviced by the one central station 14 as for example through multiplexing. The central station 14 may be the location of a postage meter manufacturer or other accountable organization.

In operation, the user at the user location 16 will be given a identification number by the central station 14 that will be placed in the NVM 26 of the server 25. This identification number will be permanent and unique for each server 25 and the user will have no access to that portion of the NVM 26 that stores the identification number. It will be appreciated that this feature may be applied to postage meters as well. Having the identification number in memory 26 eliminates the need of having a plate applied to a postage meter or a server 25. It will be appreciated that a server has many characteristics of a postage meter, i.e., security, a descending register and the like, but certain elements are absent. The most evident absent element is a printer, the advantage of which is described throughout. Another absent member is an ascending register. In a postage meter an ascending register is accessible only by a service representative of the meter manufacturer and may be used to determine if any meter tampering has taken place. Following installation of the identification number, the user will communicate with the central station 14 through the telephone 30 for the purpose of indicating to the central station the amount of postage value it wishes to have accredited to its memory 26. An access code will be given to the user that is addressed to the setting device 23 through the touch dial of the telephone 30 upon the receipt of the access code, the user will transmit to the central station 14 the proper code and identification number. The setting device 23 will function to supply or increase the postage value in the memory 26. This memory 26 will include a descending register which is charged by the central station 14 with the selected amount of postage value. As the user location 16 processes mail, the postage value in the descending register will be decreased in accordance with the postage required to process the mail pieces. Devices for charging registers such as the descending registers are well known, as for example see U.S. Pat. Nos. 3,792,446, 4,097,923 and 4,447,890.

The balance of the server 25 includes the ROM 34 that contains information which formats address signals and stores a series of programs for controlling the functions of the server 25, a RAM 32 that will hold and supply real time data, a clock 36 that will provide the time and date and an encryptor 35 that will store the code required for the descending register setting functions. The encryptor 35 can be any one of a number of encrypting devices including devices which use the Data Encryption Standards described in FIPS P4B 46, dated Jan. 15, 1977 and published by the U.S. Department of Commerce, National Bureau of Standards.

It will be appreciated that the printer 40 is a high speed, unsecured printer such as a ink jet printer or laser printer which will apply the addresses of the addressee and addressor to the face of the mail pieces under command of the input/processor 38. In addition, other information can be printed by the printer 40 upon each mail piece 42 when under command of the processor 24. This information includes a transaction number (T.A. No.), the run of the particular batch of mail, the date and time of mailing, the class of mail and a batch number. The transaction number is that number assigned to the user location by the central station every time postage value is added to the server 25 and will be stored in the NVM 26. This transaction number will be the same for one or more batches of mail that are sent and will remain unchanged until such time as the descending register of the NVM 26 is recharged with postage value, at which time a new transaction number will be assigned and stored in the NVM in place of the preceding transaction number. By changing the transaction number upon each recharge, an element is provided for verifying postage. The batch number is one assigned by the user through the input/processor 38 whereby a given batch of mail, i.e., mail of a particular type or character, will be identified by a number assigned by the user. In addition, a run number, which is a subset of the batch, may be given to identify particular segments of the batch.

When a batch of mail is to be sent, the user will supply mailing and verification information through the input/processor 38 into the user processor 24 which will transmit at least a portion of this information to the inserter 39. This information would include the number of mail pieces to be processed and number of inserts to be placed in each envelope. The time and date may be supplied to the printer 40 through the input/processor 38 by overriding the clocks 36. This is useful when future mail is being processed. The user processor 24 will then command the printer 40 to print the appropriate postage, time, date, transaction number and address on the mail pieces for a particular run. This run will be given a number that is associated with the particular mail to be sent, which number will be printed on the envelopes 42 of that run. As the printer prints the appropriate information upon each mail piece, the number of mail pieces and amount of postage required will be determined by the processor 24. At the end of the run or batch, the second printer 44 will print required information upon a passport 46.

As was stated previously, the data input to the server 25 may be accomplished manually or by tape or disc through the input/processor 38. Another way of inputting data to the server 25 would be through the use of an optical scanner 48 capable of reading and decoding bar codes. Such scanners are well known, see for example U.S. Pat. No. 3,778,597 and are commercially available. The envelopes 42 may be windowed envelopes having inserts with pre-printed bar codes. These bar codes may be pre-printed by the printer 40 through direct communication with the input/processor 38 or any other printer as desired. The bar codes would contain information on the weight of each mail piece, the date the mail is to be processed and the zip code, all of which information is known to the mail sender in advance. Upon scanning the bar codes, the scanner would input the bar code information to the processor 24 to occasion printing of the postage, date and zip code.

Referring now to FIG. 2, the passport 46 is shown after having printed thereon the total postage (Post. Total) required to mail the batch of mail, the transaction number, piece count for a batch, descending register amount (Reg. Am.) after subtraction for the postage, the date, the time, the class, the batch number and the run. Additionally, the server identification number stored in the NVM 26, user name and any desired graphics can be printed. This information on the passport 46 serves many purposes. Firstly, the register amount acts as a physical record of the postage value stored in the descending register of the NVM 26. This amount is printed on the passport 46 on the upper right hand. The register amount will be that amount in the descending register after all postal charges have been made for the batch of mail to be sent. By placing this register amount on the passport 46 after the mailing of each batch, an ongoing, permanent record is maintained of the amount of postage value contained within the NVM 26. In this way, if there is a disaster wherein the server 25 is destroyed or the memory 26 therein is erased inadvertently, the user will still have a means for verifying the amount of postage value remaining from that amount of postage value originally purchased and stored. It should be expressly recognized that the printing of the descending register value has applicability beyond the concept of printing the descending value on passport after a group of mail has been processed. Specifically, it is within the scope of the present invention that the server, as well as postage meters in general, can be conditioned to print the value of the descending register, and any other data of interest such as the date and time of the day, after each imprint is generated. Thus, the present concept of printing the descending register value and other information of significance can be incorporated in servers 25 or postage meters without the use of other aspects of the present invention. The transaction number provides an authorization check as does the identification or server number. By changing the transaction number with each recharge of the server, one can readily determine if more postage accompanies a transaction number than is authorized. Also printed on the passport 46 will be the date and time the passport 46 is printed, the piece count, i.e., the number of mail pieces mailed in the particular batch, and the class of mail. Upon the printing of the information on the passport 46, the postage amount for the batch will be subtracted from the descending register in the NVM 26.

The information printed upon the passport 46 is transmitted to the central station 14 through the communication line 28 automatically after each batch, is processed so that a record is maintained through the processor 18 that communicates with memory 22. The memory 22 has an ascending register therein that corresponds to the descending register in the server 25, i.e., one is the inverse of the other. As is known, an ascending register is one that accumulates charges over a long term. Optionally, the memory 22 may have a descending register that duplicates the amounts in the descending register in the NVM on an ongoing basis. By having the postage value contained within the memory 22 that corresponds to the value of the server 25, a check is constantly made to assure that there is a correspondence between the passport 46 information and the amount of postage paid by the user. More, specifically, the total amount credited to the user location will be stored in memory 22 and if the amount in the ascending register exceeds that total amount the user location will be notified that there are insufficient funds. When a batch of mail is sent to a post office, the passport 46 for that particular batch will accompany the mail. The postal employee can determine whether it is an authorized transmission of mail from the information contained upon the accompanying passport 46. If there is any question of the part of the postal service as to whether the information is authentic, it will contact the central station 14 and through the line 19 obtain the information from the central station to verify the information contained on the passport 46. If this information is accurate, then the postal service will know that the mail is authorized, i.e., the postage for the mail has been paid. On the other hand, if there is any discrepancy, the postal service is able to act to ferret any fraud or correct any discrepancy. As is the usual practice in the user of postage meters, a user location 16 will send all its mail to an assigned post office.

Referring now to FIG. 3, an envelope 42 is shown as it would be prepared by the present system 10. In the upper left hand corner is the address of the mail sender and the upper right hand corner a statement that indicates the class of mail and gives the identification or server number of the mail sender. This information may be preprinted on the envelopes 42 prior to processing of a batch. Such preprinting may be accomplished through interaction of the input/process 38 in direct communication with the printer 44 without any participation of the other components of the user station 16.

In the processing of the batch mail the three address lines will first be printed with the name of the recipient, the street address then the city, state, zip code. The fourth line is then printed through information supplied by the processor 24 and this postage line, includes the postage amount $0.22, the date, Oct. 8, 1985 and the transaction number which in this case is C2J2743T56. Other information may be given on this postage line if so desired including the time the mail is processed. Although the postage line is shown in alpha-numerics it will be appreciated that the same may be printed in bar code and, optionally, bar code information may be printed on the envelope as desired.

Although an envelope 42 is shown that has the information printed on the face thereof the same scheme will apply to a windowed envelope. In a windowed envelope it may be preprinted as previously described but instead of the printer 40 printing on the face of the envelope 42 an insert would be printed with the information shown on the face of the envelope 42 and inserted so as to be viewed from the window.

In this way what is provided is a method of allowing an organization to send large amounts of mail without having to frank every piece. In addition, the postal service is saved the problem of requiring on-site inspections at the user location 16 in order to verify that no unauthorized mail is being sent. By correlating the amount of postage, the transaction number, piece count, registration amount and the like, verification can be made without the need of encryption. The central station more or less acts as a bank representing the postal service and handles the funds on its behalf as well as maintains records for verification. The funds or postage value charged to the server 25 may be either pre-paid or charged to the user by the central station on a credit arrangement. The central station would be accountable to the postal service for the postage value placed in the server on a immediate basis.

Another advantage of this system is that the printer 40 that prints the large numbers of mail pieces is not part of the security member, i.e., the server 25, as in the case of a postage meter. Because of this, the printer may be replaced frequently without the expense or inconvenience of entire replacement. It will be appreciated that one printer may be used in place of the two printers 40, 44 shown and described, but the preferred embodiment contemplates the use of two printers for the reasons given.

The present invention provides enhanced security that enables the transfer of funds from one meter to another meter at a user location 16. Heretofore all such transfers in postage meters, because of security requirements and postal regulations, have been effectuated under the supervision of a postal worker. Because of this, significant increased cost is added to the system in that both a meter to be taken out of service and a new meter to be put into service must be physically transported to the postal authorities facility. Under existing procedures, and practices, the postage meter manufacturer sends a service representative to the user's location who physically collects the meter and takes it to the Post Office along with a new meter to be recharged. At the Post Office, the postal worker accesses the data center to decrement the old meter descending register and to increment the descending register of the new meter. Thereafter, the postage meter manufacturer service representative transports the new meter to the customer and the old meter to the manufacturer. This inconveniences the user by the removal of the meter from the user's facility, increases the cost by the necessity to transport the meter to the postal service and increases the cost by requiring the participation of the postage meter manufacturer service representative (who transports the two meters) as well as the postal worker.

The server 25 or meter constructed in accordance with the present invention provides enhanced security that avoids the above noted shortcomings and enables the transfer of funds at a user location 16. The system provides a level of security previously not available such that the central station 14, which may be a postage meter manufacture service representative, alone may effectuate the transfer. Moreover, if adequate directions are provided, the transfer of funds may be effectuated by the user alone, without the assistance of the central station 14. The new server 25 or meter can be delivered to the user by a parcel delivery service and the old server 25 can be returned by a parcel delivery service to the central station or postal authorities.

The server 25 or meter has a unique routine which generates a unique and/or encrypted combination which is provided to the data center to verify and thereby provide proof that the descending register of the meter to be taken out of service has been appropriately changed, such as, to zero. This routine ensures that the combination provided by the central station to decrement the descending register was indeed entered into the meter. It should be recognized that the meter descending register can be changed to any value, not only to zero. Thus, altered postage value can be added to or taken out of the registers of the meter.

The procedure for removing the old meter from service and transferring the funds is as follows: the user contacts the central station 14 and requests the meter replacement function. This is the function at the central station 14 associated with transferring funds from one server 25 or meter to another. The user provides sufficient identification as to the server 25 or meter. This can include the user identification number, the server 25 or meter serial number being removed from service as well as the serial number of the device being newly installed. For the server 25 or meter being removed from service, the user provides data including an access code to demonstrate that the user in fact has physical access to the server or meter whose descending register is to be decremented. In response to this information, the central station provides a unique combination which, when entered into the server 25 or meter will decrement the descending register to zero, or to any other value selected. It should be noted that embedded in this combination can be data relating to the time, date or other relevant factors such as zip code, location of the user and the like.

The combination upon being entered into the meter decrements the meter's descending register as previously noted and, additionally, provides data which is used as the input in conjunction with the decrementing of the descending register postage value to a unique routine associated with the server 25 or meter. If, for example, a descending register value of zero funds is represented by the number 10, the number 10 in conjunction with the entered combination can be passed through a function as for example, the function disclosed in U.S. Pat. No. 4,097,923 and additionally passed through an encryption module 35 such as a data encryption standard (DES) type of module to generate an encrypted unique number. Additionally provided as input data to the unique routine is the date and time thus, the encrypted new unique combination generated by the server 25 or meter includes data indicating: (i) that the register has been decremented, (ii) the time of day and date of the decrementing of the register and, again, if desired, (iii) the exact combination entered to decrement the descending register. It is expressly recognized that various alternative combinations of data can be included to provide the input data to the routine depending upon the needs and desires of the particular postal service.

The unique combination which may also be encrypted, when generated is displayable upon the display of the input/processor 38 and/or other associated display. This information is communicated back to the central station 14. If the server 25 or meter is equipped with communication facilities, the communications transaction can be automatically effectuated without the need for human intervention.

The central station 16 processes the received combination to decrypt and thereafter restore the data to ensure (i) the register of the server 25 or meter to be taken out of service has been decremented as required and, if a clock function is provided, (ii) that the decrementing of the register occurs within a prescribed period of the issuance of the decrementing combination. Again, additional functions and checks can be provided depending upon needs and desires of the particular postal service involved. Upon such verification, the central station 14 generates and provides to the user the new reset combination for the transfer of postage value. The user thereafter enters the new reset combination into the new server 25 or meter in accordance with the previously described functions. If it is desired, for security or other reasons, again, the transaction number can be generated and displayed to verify that the new server 25 or meter has in fact been reset with postage funds. Simultaneously, the central station 14 can generate the necessary reporting to the postal service indicating the fact that the funds transfer has been effectuated so that the postal service can expect the return of the server 25 or meter being taken out of service.

What is claimed is:

1. In a postage device of the type including a descending register for storing postage value remaining to be printed, the improvement comprising:
   printing means, and
   processor means in communication with said printing means for causing said printing means to print the value of postage value stored by said descending register and available to be dispensed.

2. A postage device as defined in claim 1 wherein said printing means is adapted to print a postage value on a mail piece.

3. A postage device as defined in claim 2 further comprising: a non-volatile memory for storing said descending register value.

4. A postage device as claimed in claim 1 wherein said printing means is adapted to print postage value on a tape to be applied to a mail piece.

5. A postage device as defined in claim 1 wherein said printing means is adapted to print a postage value on a passport.

6. A postage device as defined in claim 1 wherein said printing means prints the time of day and data when said descending register value was printed.

7. A postage device as defined in claim 1 wherein said printing means further prints unique transaction number associated with a series of mail pieces.

8. A postage device as defined in claim 1 wherein said printing means further prints the class of a series of mail pieces.

9. A postage device as defined in claim 1 wherein said printing means further prints a batch number.

10. A postage device as defined in claim 1 wherein said printing means further prints a unique transaction number associated with a particular recharging of said descending register.

11. In a postage device of the type including a descending register of storing postage value remaining to be printed, the improvement comprises:
  printing means; and
  processor means in communication with said printing means for causing said printing means to print a unique transaction number associated with a particular recharging of said descending register.

12. A postage device as defined in claim 11 wherein said printing means prints said unique transaction number associated with a particular recharging of said descending register on an envelope.

13. A postage device as defined in claim 12 wherein said printing means prints said unique transaction number associated with a particular recharging of said descending register on a statement sheet.

14. A postage device as defined in claim 12 wherein said printing means prints said unique transaction number associated with a particular recharging of said descending register on mail pieces and on a statement sheet.

* * * * *

Disclaimer

4,853,865—Ronald P. Sansone, Weston; Guy L. Fougere, Easton, both of Conn. MAILING SYSTEM WITH POSTAGE VALUE PRINTING CAPABILITY. Patent dated August 1, 1989. Disclaimer filed May 1, 1998, by the assignee, Pitney Bowes, Inc.

The term of this patent shall not extend beyond the expiration date of Pat. No. 4,760,552.
*(Official Gazette,* September 8, 1998)